United States Patent
Hou et al.

(10) Patent No.: US 12,204,190 B2
(45) Date of Patent: Jan. 21, 2025

(54) DISPLAY DEVICE WITH BUILT-IN CAMERA

(71) Applicant: WUHAN CHINA STAR OPTOELECTRONICS TECHNOLOGY CO., LTD., Hubei (CN)

(72) Inventors: Shaojun Hou, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,072

(22) PCT Filed: Dec. 15, 2021

(86) PCT No.: PCT/CN2021/138426
§ 371 (c)(1),
(2) Date: Dec. 22, 2021

(87) PCT Pub. No.: WO2023/102979
PCT Pub. Date: Jun. 15, 2023

(65) Prior Publication Data
US 2024/0310669 A1    Sep. 19, 2024

(30) Foreign Application Priority Data

Dec. 7, 2021    (CN) .......................... 202111482002.5

(51) Int. Cl.
G02F 1/1333    (2006.01)
G02F 1/1335    (2006.01)
G02F 1/13357   (2006.01)

(52) U.S. Cl.
CPC .... *G02F 1/13338* (2013.01); *G02F 1/133512* (2013.01); *G02F 1/133605* (2013.01); *G02F 1/133606* (2013.01); *G02F 1/133611* (2013.01)

(58) Field of Classification Search
None
See application file for complete search history.

(56) References Cited

U.S. PATENT DOCUMENTS

| | | | |
|---|---|---|---|
| 2011/0051412 A1 | 3/2011 | Chansung | |
| 2019/0331955 A1* | 10/2019 | Lee | G02F 1/13476 |

(Continued)

FOREIGN PATENT DOCUMENTS

| | | |
|---|---|---|
| CN | 108900672 A | 11/2018 |
| CN | 109120753 A | 1/2019 |

(Continued)

OTHER PUBLICATIONS

International Search Report in International application No. PCT/CN2021/138426, mailed on Sep. 9, 2022.

(Continued)

*Primary Examiner* — Shan Liu
(74) *Attorney, Agent, or Firm* — PV IP PC; Wei Te Chung (57) ABSTRACT

A display device with a built-in camera is provided, including: a display panel, a first backlight module, a second backlight module, a third backlight module, a camera, a first light-shielding column, and a second light-shielding column. The camera is configured to acquire external light to take a picture. The first light-shielding column is configured to block light from laterally entering the first light-shielding column, and the second light-shielding column is configured to block light from laterally entering the second light-shielding column.

20 Claims, 4 Drawing Sheets

(56) References Cited

U.S. PATENT DOCUMENTS

| | | | |
|---|---|---|---|
| 2021/0294015 A1* | 9/2021 | Yin | G02B 6/0051 |
| 2024/0045134 A1* | 2/2024 | Zhang | G02B 6/008 |

FOREIGN PATENT DOCUMENTS

| | | | | | |
|---|---|---|---|---|---|
| CN | 110138935 | A | | 8/2019 | |
| CN | 209911713 | U | * | 1/2020 | |
| CN | 111179744 | A | | 5/2020 | |
| CN | 111752027 | A | * | 10/2020 | G02B 6/0051 |
| CN | 112987398 | A | * | 6/2021 | G02F 1/1323 |
| CN | 113253516 | A | | 8/2021 | |
| CN | 113744641 | A | | 12/2021 | |
| JP | 2010226727 | A | | 10/2010 | |
| WO | WO-2020192370 | A1 | * | 10/2020 | G02F 1/133528 |

OTHER PUBLICATIONS

Written Opinion of the International Search Authority in International application No. PCT/CN2021/138426, mailed on Sep. 9, 2022.

Chinese Office Action for Invention issued in corresponding Chinese Patent Application No. 202111482002.5 dated Jun. 27, 2022, pp. 1-8.

* cited by examiner

FIG. 1

(PRIOR ART)

DISPLAY DEVICE WITH BUILT-IN CAMERA

CROSS-REFERENCE TO RELATED APPLICATIONS

This application is a 371 U.S. National Phase of International Application No. PCT/CN2021/138426, filed Dec. 15, 2021, which claims priority to Chinese Patent Application No. 202111482002.5, filed Dec. 7, 2021. The entire disclosures of the above applications are incorporated herein by reference.

FIELD OF DISCLOSURE

The present disclosure relates to the field of display technologies, and in particular to a display device with a built-in camera.

BACKGROUND

With the development of display technologies, a display screen with a high screen-to-body ratio in a terminal equipment has become a mainstream trend. Since the terminal equipment is equipped with functional devices that require lighting, such as cameras, light sensors, etc., it is difficult to maximize the screen-to-body ratio of the display screen. Solutions such as lifting cameras and sliding covers have been developed to increase the screen-to-body ratio, but these solutions require additional module structures or to increase a thickness of the terminal equipment, which reduces a user experience.

In the prior art, solutions such as openings are usually used to remove a portion of the display screen to set up the functional devices and provide a lighting window for the functional devices. Therefore, a true full screen cannot be realized.

Figure 1:
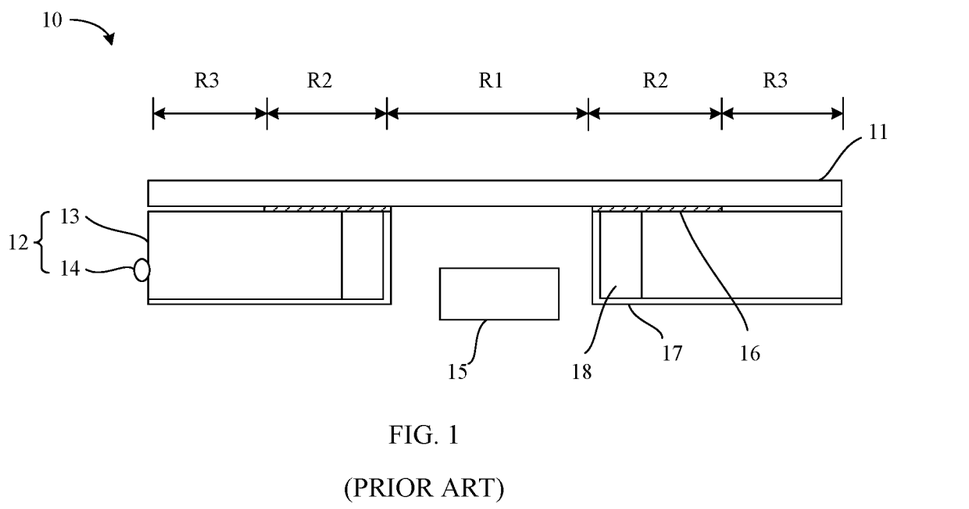
FIG. 1 shows a schematic diagram of a display device in the prior art.

Another solution in the prior art is to set a camera below the display screen. Referring to FIG. 1, which shows a schematic diagram of a display device 10 in the prior art. The display device 10 includes a display panel 11, a backlight module 12, a camera 15, a light-shielding adhesive 16, a metal frame 17 and a sealant 18. The backlight module 12 includes a light guide plate 13 and a light source 14. The display panel 11 includes a first region R1, a second region R2, and a third region R3. The first region R1 of the display panel 11 is only used as a lighting window of the camera 15 and does not have a display function. In addition, in order to prevent the backlight module 12 from leaking light and affecting a shooting of the camera 15, the light-shielding adhesive 16, the metal frame 17, and the sealant 18 must be provided for shielding light, so that the second region R2 of the display panel 11 is displayed as a black border. Therefore, the solution has failed to achieve a true full screen.

Accordingly, it is necessary to provide a display device to solve the problems existing in the prior art.

SUMMARY OF DISCLOSURE

In order to solve the above-mentioned problems in the prior art, the purpose of the present disclosure is to provide a display device with a built-in camera, which can achieve a full-screen display and can preventing the backlight module from leaking light and affecting a shooting of a camera.

To achieve the above objective, the present disclosure provides a display device with a built-in camera, including: a display panel including a first region, a second region, and a third region, wherein the second region is disposed between the first region and the third region; a first backlight module disposed on a light incident surface of the display panel, and configured to provide light to the first region of the display panel, wherein the first backlight module includes a first via hole; a second backlight module disposed on a surface of the first backlight module away from the display panel, and configured to provide light to the second region of the display panel, wherein the second backlight module includes a second via hole, and the first via hole is connected to the second via hole; a third backlight module disposed on a surface of the second backlight module away from the first backlight module, and configured to provide light to the third region of the display panel, wherein the third backlight module covers an end of the second via hole away from the first backlight module; a camera disposed on a side of the third backlight module away from the second backlight module, wherein the camera is aligned with the third region of the display panel, and is configured to obtain external light to take a picture, and the external light enters an interior of the display device through the third region; a first light-shielding column disposed in the first via hole, wherein the first light-shielding column is a three-dimensional ring-shaped column structure and includes a hollow portion, and the first light-shielding column is configured to block the light from the first backlight module from laterally entering the first light-shielding column; and a second light-shielding column disposed between the display panel and the third backlight module, wherein the second light-shielding column is a three-dimensional columnar structure and extends vertically through the second via hole and the hollow portion of the first light-shielding column, and the second light-shielding column is configured to block light from the first light-shielding column from laterally entering the second light-shielding column.

The present disclosure also provides a display device with a built-in camera, including: a display panel including a first region, a second region, and a third region, wherein the second region is disposed between the first region and the third region; a first backlight module disposed on a light incident surface of the display panel, and configured to provide light to the first region of the display panel, wherein the first backlight module includes a first via hole; a second backlight module disposed on a surface of the first backlight module away from the display panel, and configured to provide light to the second region of the display panel, wherein the second backlight module includes a second via hole, and the first via hole is connected to the second via hole; a third backlight module disposed on a surface of the second backlight module away from the first backlight module, and configured to provide light to the third region of the display panel, wherein the third backlight module covers an end of the second via hole away from the first backlight module; a camera disposed on a side of the third backlight module away from the second backlight module, wherein the camera is aligned with the third region of the display panel, and is configured to obtain external light to take a picture, and the external light enters an interior of the display device through the third region; a first light-shielding column disposed in the first via hole and including a hollow portion, wherein the first light-shielding column is configured to block the light from the first backlight module from laterally entering the first light-shielding column; and a second light-shielding column disposed between the display panel and the third backlight module, and extending vertically through the second via hole and the hollow portion of the first light-shielding column, wherein the second light-shielding column is configured to block light from the first light-shielding column from laterally entering the second light-shielding column.

In some embodiments, the third backlight module includes alight adjustment layer and a light source, and the light source is disposed on at least one side of the light adjustment layer; and the light adjustment layer is controlled to be in a foggy state or a transparent state by controlling a voltage applied to the light adjustment layer, in response to the light adjustment layer being in the foggy state, the light source emits light and the light is transmitted to the third region of the display panel through the light adjustment layer, and in response to the light adjustment layer being in the transparent state, the light source is turned off and the external light is transmitted to the camera through the third backlight module.

In some embodiments, the light adjustment layer includes an upper electrode, a lower electrode, and a polymer layer, and the polymer layer is disposed between the upper electrode and the lower electrode.

In some embodiments, the first backlight module includes: a first reflective layer; a first light conducting layer disposed on the first reflective layer; a first diffusion layer disposed on the first light conducting layer; a first brightness enhancement layer disposed between the first diffusion layer and the light incident surface of the display panel; and a first light source disposed on at least one side of the first light conducting layer.

In some embodiments, the first reflective layer, the first light conducting layer, the first diffusion layer, and the first brightness enhancement layer respectively include openings of a same size, the openings together form the first via hole, and a diameter of the first via hole is greater than a diameter of the second via hole.

In some embodiments, the first via hole includes a first sub via hole and a second sub via hole; the first reflective layer, the first light conducting layer, the first diffusion layer, and the first brightness enhancement layer respectively include openings; the openings of the first reflective layer and the first light conducting layer together form the first sub via hole, the openings of the first diffusion layer and the first brightness enhancement layer together form the second sub via hole, and a diameter of the first sub via hole is greater than a diameter of the second sub via hole; and the first light-shielding column is disposed in the first sub via hole and is in contact with a wall of the first sub via hole.

In some embodiments, the diameter of the second sub via hole is equal to a diameter of the second via hole, and the second light-shielding column is in contact with a wall of the second sub via hole and a wall of the second via hole.

In some embodiments, the diameter of the second sub via hole is less than a diameter of the second via hole, and the second light-shielding column is in contact with a wall of the second sub via hole; and the second light-shielding column is separated from a wall of the second via hole by a lateral distance.

In some embodiments, the third region of the display panel includes a first subregion and a second subregion, the second subregion surrounds the first subregion, and the second subregion is disposed between the second region and the first subregion; the third backlight module includes a light adjustment layer and a light source, the light source is disposed on at least one side of the light adjustment layer, the light adjustment layer includes a first section and a second section, and a haze of the first section and a haze of the second section can be adjusted independently; the first section of the third backlight module transmits the light emitted by the light source to the first subregion of the display panel through the second light-shielding column, and the second section of the third backlight module transmits the light emitted by the light source to the second subregion of the display panel through the second via hole, the first light-shielding column, the first diffusion layer, and the first brightness enhancement layer in sequence.

In some embodiments, the first light-shielding column includes a first light-transmitting column and a first light-shielding layer, and the first light-shielding layer covers a side surface of the first light-transmitting column; and the second light-shielding column includes a second light-transmitting column and a second light-shielding layer, and the second light-shielding layer covers a side surface of the second light-transmitting column.

In comparison with the prior art, the present disclosure uses different backlight modules to provide light to different regions of the display panel, brightness of different regions of the display panel can be independently controlled, and a true full-screen display is also realized. In addition, by setting the light-shielding columns, it can prevent a light leakage of the first backlight module from affecting a shooting of the camera, thereby achieving excellent light leakage prevention performance and ensuring a shooting quality of the camera.

BRIEF DESCRIPTION OF DRAWINGS

The following describes specific embodiments of the present disclosure in detail with reference to accompanying drawings to make technical solutions and other beneficial effects of the present disclosure obvious.

Reference numerals of components in the drawings are as follows:

display device 10, display panel 11, backlight module 12, light guide plate 13, light source 14, camera 15, light-shielding adhesive 16, metal frame 17, sealant 18, first region R1, second region R2, third region R3;

display device 100, display panel 110, first backlight module 120, second backlight module 130, third backlight module 140, camera 150, first light-shielding column 160, second light-shielding column 170, first region 111, second region 112, third region 113, light incident surface 114, first reflective layer 121, first light conducting layer 122, first diffusion layer 123, first brightness enhancement layer 124, first light source 125, first via hole 126, second reflective layer 131, second light conducting layer 132, second diffusion layer 133, second brightness enhancement layer 134, second light source 135, second via hole 136, light adjustment layer 141, third light source 142, upper electrode 1411, lower electrode 1412, polymer layer 1413, first light-transmitting column 161, first light-shielding layer 162, hollow portion 163, second light-transmitting column 171, second light-shielding layer 172, diameter D1/D2, light L;

display device 200, display pane 1210, first backlight module 220, second backlight module 230, third backlight module 240, camera 250, first light-shielding column 260, second light-shielding column 270, first region 211, second region 212, third region 213, first reflective layer 221, first light conducting layer 222, first diffusion layer 223, first brightness enhancement layer 224, first light source 225, first sub via hole 2261, second sub via hole 2262, second reflective layer 231, second light conducting layer 232, second light source 235, second via hole 236, hollow portion 263, diameter D11/D12/D3;

display device 300, display panel 310, first backlight module 320, second backlight module 330, third backlight module 340, camera 350, first light-shielding column 360, second light-shielding column 370, first region 311, second region 312, first subregion 3131, second subregion 3132, first reflective layer 321, first light conducting layer 322, first diffusion layer 323, first brightness enhancement layer 324, first light source 325, first sub via hole 3261, second sub via hole 3262, second via hole 336, light adjustment layer 341, third light source 342, upper electrode 3411, lower electrode 3412, polymer layer 3413, first section 3401, second section 3402;

terminal equipment 1, display device 2, display panel 3, first region 31, second region 32, third region 33.

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

Figure 2:
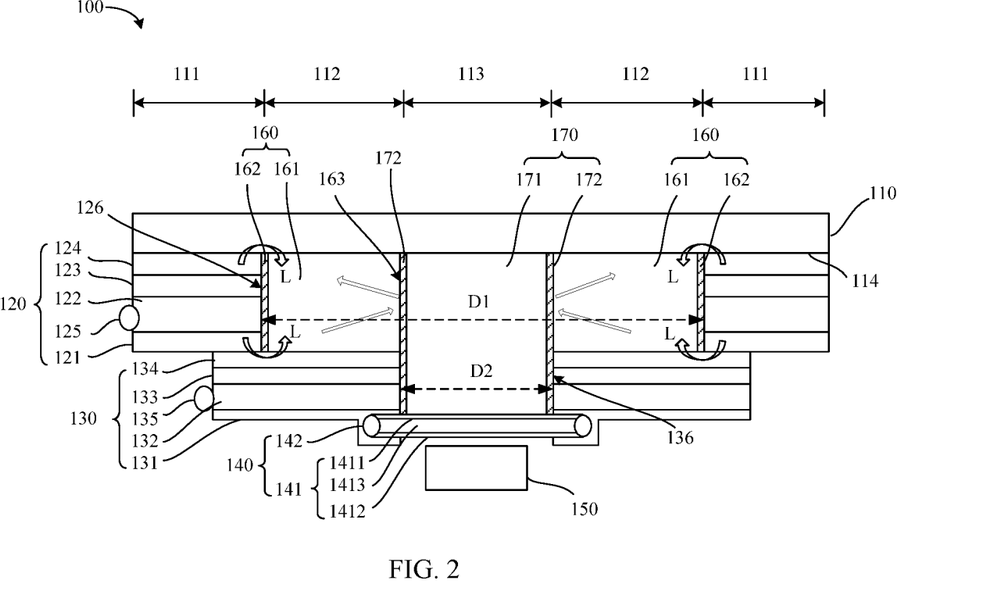
FIG. 2 shows a schematic diagram of a display device according to a first embodiment of the present disclosure.

Referring to FIG. 2, which shows a schematic diagram of the display device 100 according to the first embodiment of the present disclosure. The display device 100 includes a display panel 110, a first backlight module 120, a second backlight module 130, a third backlight module 140, a camera 150, a first light-shielding column 160, and a second light-shielding column 170. The display panel 110 includes a first region 111, a second region 112, and a third region 113. In a three-dimensional structure of the display device 100, the third region 113 is a geometric (such as circle, square, polygon, etc.) region corresponding to the camera 150. The second region 112 is an annular region surrounding the third region 113. The first region 111 is all regions except the second region 112 and the third region 113 in the display panel 110, and the second region 112 is disposed between the first region 111 and the third region 113. The display panel 110 includes a light incident surface 114 and a light-emitting surface. The light-emitting surface is a surface on which an image is displayed.

As shown in FIG. 2, the first backlight module 120 is disposed on the light incident surface 114 of the display panel 110, and is configured to provide light to the first region 111 of the display panel 110. The first backlight module 120 includes a first reflective layer 121, a first light conducting layer 122, a first diffusion layer 123, a first brightness enhancement layer 124, a first light source 125, and a first via hole 126. The first light conducting layer 122 is disposed on the first reflective layer 121. The first diffusion layer 123 is disposed on the first light conducting layer 122. The first brightness enhancement layer 124 is disposed on the first diffusion layer 123 and disposed between the first diffusion layer 123 and the light incident surface 114 of the display panel 110. The first light source 125 is disposed on at least one side of the first light conducting layer 122. The first via hole 126 extends through the first reflective layer 121, the first light conducting layer 122, the first diffusion layer 123, and the first brightness enhancement layer 124. It should be noted that in the drawings, a line with an arrow represents a virtual structure (e.g., an opening, a hollow portion), and a line without an arrow represent a physical structure.

As shown in FIG. 2, the second backlight module 130 is disposed on a surface of the first backlight module 120 away from the display panel 110, and is configured to provide light to the second region 112 of the display panel 110. The second backlight module 130 includes a second reflective layer 131, a second light conducting layer 132, a second diffusion layer 133, a second brightness enhancement layer 134, a second light source 135, and a second via hole 136. The second light conducting layer 132 is disposed on the second reflective layer 131. The second diffusion layer 133 is disposed on the second light conducting layer 132. The second brightness enhancement layer 134 is disposed on the second diffusion layer 133, and is disposed between the second diffusion layer 133 and the first backlight module 120. The second light source 135 is disposed on at least one side of the second light conducting layer 132. The second via hole 136 extends through the second reflective layer 131, the second light conducting layer 132, the second diffusion layer 133, and the second brightness enhancement layer 134. Furthermore, the first via hole 126 is connected to the second via hole 136. Preferably, the first via hole 126 and the second via hole 136 are coaxially arranged.

As shown in FIG. 2, in the first embodiment, the first reflective layer 121, the first light conducting layer 122, the first diffusion layer 123, and the first brightness enhancement layer 124 of the first backlight module 120 respectively include openings of a same size, and these openings together form the first via hole 126 of the first backlight module 120. The second reflective layer 131, the second light conducting layer 132, the second diffusion layer 133, and the second brightness enhancement layer 134 of the second backlight module 130 respectively include openings of a same size, and these openings together form the second via hole 136 of the second backlight module 130. A diameter D1 of the first via hole 126 is greater than a diameter D2 of the second via hole 136.

As shown in FIG. 2, the third backlight module 140 is disposed on a surface of the second backlight module 130 away from the first backlight module 120, and is configured to provide light to the third region 113 of the display panel 110. The third backlight module 140 covers an end of the second via hole 136 of the second backlight module 130 away from the first backlight module 120. The third backlight module 140 includes a light adjustment layer 141 and a third light source 142. The third light source 142 is disposed on either side or both sides of the light adjustment layer 141. The light adjustment layer 141 includes an upper electrode 1411, a lower electrode 1412, and a polymer layer 1413. The polymer layer 1413 is disposed between the upper electrode 1411 and the lower electrode 1412. The upper electrode 1411 and the lower electrode 1412 may be made of transparent conductive materials, such as indium tin oxide (ITO). The polymer layer 1413 is made of an electro-haze adjustable material. The light adjustment layer 141 is controlled to be in a foggy state or a transparent state by controlling a voltage applied to the upper electrode 1411 and the lower electrode 1412 of the light adjustment layer 141. The electro-haze adjustable material includes polymer dispersed liquid crystal (PDLC), polymer network liquid crystal (PNLC), focal-conic state of cholesteric liquid crystal, and the like. In some embodiments, the third backlight module 140 further includes a light reflection film, which covers a light incident side of the third light source 142 and a part of the light adjustment layer 141 to improve a light utilization rate of the third backlight module 140.

As shown in FIG. 2, the camera 150 is disposed on a side of the third backlight module 140 away from the second backlight module 130. The camera 150 is aligned with the third region 113 of the display panel 110.

As shown in FIG. 2, the first light-shielding column 160 is a three-dimensional ring-shaped column structure, and the second light-shielding column 170 is a three-dimensional columnar structure. The first light-shielding column 160 is disposed in the first via hole 126. The first light-shielding column 160 is configured to block the light L emitted by the first backlight module 120 from laterally entering the first light-shielding column 160. Specifically, the first light-shielding column 160 includes a first light-transmitting column 161, a first light-shielding layer 162, and a hollow portion 163. The first light-shielding layer 162 covers a side surface of the first light-transmitting column 161. The hollow portion 163 extends through an upper surface and a lower surface of the first light-transmitting column 161. It should be noted that the first light-shielding layer 162 does not cover the upper surface and the lower surface of the first light-transmitting column 161, so that the first light-shielding column 160 serves as a channel for a vertically transmitted light and blocks the laterally transmitted light L from passing. For example, the vertically transmitted light means the light transmitted from the second backlight module 130 to the display panel 110, and the laterally transmitted light L means the light L traveling from the first backlight module 120 to an interior of the first light-shielding column 160.

As shown in FIG. 2, the second light-shielding column 170 is disposed between the display panel 110 and the third backlight module 140, and extends vertically through the second via hole 136 of the second backlight module 130 and the hollow portion 163 of the first light-shielding column 160. The second light-shielding column 170 is configured to block the light from laterally entering the second light-shielding column 170, such as the light emitted by the second backlight module 130 or the light leaking from the first backlight module 120 and transmitted through the first light-shielding column 160. Specifically, the second light-shielding column 170 includes a second light-transmitting column 171 and a second light-shielding layer 172. The second light-shielding layer 172 covers a side surface of the second light-transmitting column 171. It should be noted that the second light-shielding layer 172 does not cover upper and lower surfaces of the second light-transmitting column 171, so that the second light-shielding column 170 serves as a channel for the vertically transmitted light and blocks the laterally transmitted light from passing. For example, the vertically transmitted light means the light transmitted from the third backlight module 140 to the display panel 110, and the laterally transmitted light means the light traveling from the first backlight module 120 and/or the second backlight module 130 to an interior of the second light-shielding column 170.

In the present disclosure, when the display device 100 displays images and the camera 150 is not activated, the light sources of the first backlight module 120, the second backlight module 130, and the third backlight module 140 are turned on, and the light adjustment layer 141 of the third backlight module 140 is switched to the foggy state. In response to the light adjustment layer 141 being in the foggy state, the light emitted by the third light source 142 enters the light adjustment layer 141 and emits light in all directions through the scattering effect of the haze material, and then is transmitted to the third region 113 of the display panel 110 through the second light-shielding column 170. At this time, the first region 111, the second region 112, and the third region 113 of the display panel 110 can all receive the light from the corresponding backlight module, so the first region 111, the second region 112, and the third region 113 of the display panel 110 can all display images, thereby realizing a full-screen display. In the present disclosure, due to a low luminous efficacy of the third backlight module 140, in order to ensure a brightness uniformity of the display panel 110, a size of the third backlight module 140 is theoretically limited. However, the second backlight module 130 provides the display light source of the second region 112 of the display panel 110, so that the size of the third backlight module 140 is not limited by the size of the first via hole 126 of the first backlight module 120, and can be made as small as possible to ensure an overall brightness uniformity of the display panel 110 is optimized.

On the other hand, when the display device 100 displays images and the camera 150 is activated, the first light source 125 of the first backlight module 120 is turned on, the light sources of the second backlight module 130 and the third backlight module 140 are turned off, and the light adjustment layer 141 of the third backlight module 140 is switched to the transparent state. In response to the light adjustment layer 141 being in the transparent state, external light enters an interior of the display device 100 through the third region 113 of the display panel 110, and the external light can also be transmitted to the camera 150 through the light adjustment layer 141 of the third backlight module 140 in the transparent state, so that the camera 150 can obtain the external light to take a picture. At this time, the first region 111 of the display panel 110 displays images, and the second region 112 and the third region 113 of the display panel 110 do not display images. It should be noted that when the camera 150 is activated, the first light-shielding column 160 can shield the light leaking from the first backlight module 120 laterally, that is, the light traveling toward the interior of the first light-shielding column 160. The second light source 135 is turned off to ensure that no light from the second backlight module 130 enters a lighting path of the camera 150. In addition, a weak light leaking from the first backlight module 120 is further weakened by the reflection and absorption of each layer of the second backlight module 130. Furthermore, the second light-shielding layer 172 of the second light-shielding column 170 can further shield the light traveling toward the interior of the second light-shielding column 170, thereby ensuring that only the external light can enter the camera 150. In other words, the second backlight module 130 can prevent a light leakage portion of the first backlight module 120 from being adjacent to the lighting path of the camera 150, and a lateral distance from the light leakage portion of the first backlight module 120 to the lighting path of the camera 150 can be increased. Also, the setting of the light-shielding columns can greatly reduce a risk of reducing the quality of shooting due to light leakage.

Figure 3:
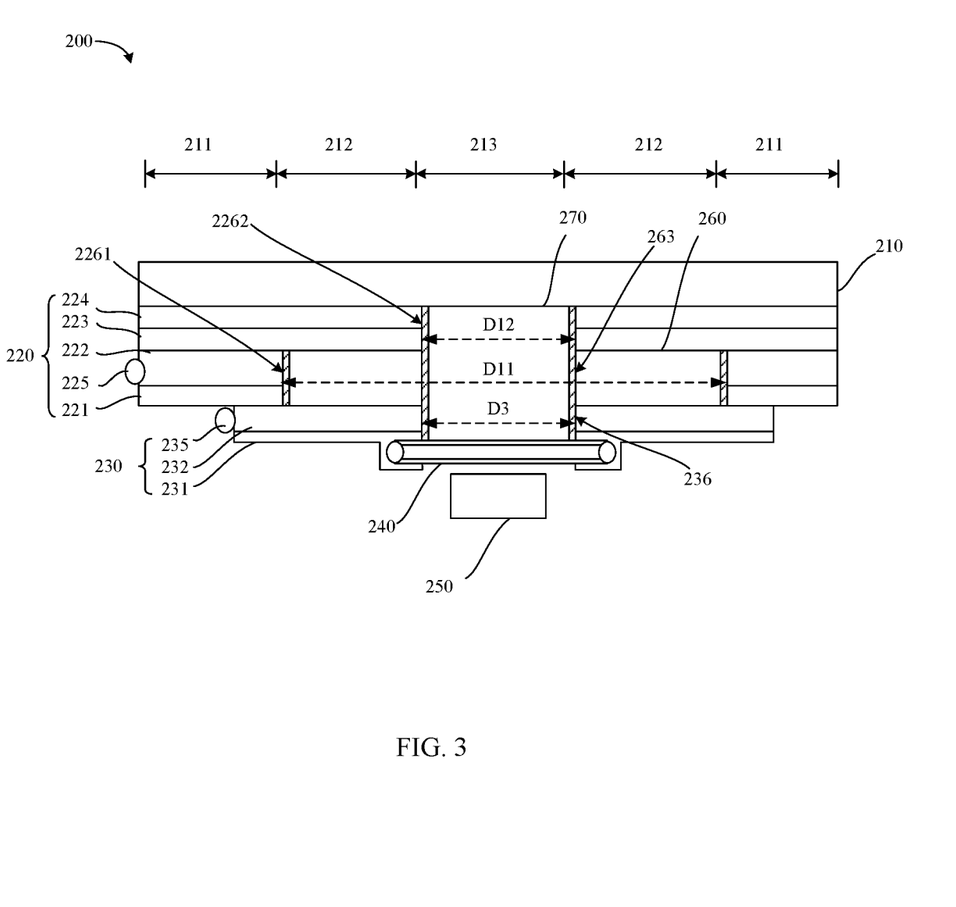
FIG. 3 shows a schematic diagram of a display device according to a second embodiment of the present disclosure.

Referring to FIG. 3, which shows a schematic diagram of a display device 200 according to a second embodiment of the present disclosure. The display device 200 includes a display panel 210, a first backlight module 220, a second backlight module 230, a third backlight module 240, a camera 250, a first light-shielding column 260, and a second light-shielding column 270. The display panel 210 includes a first region 211, a second region 212, and a third region 213. The second region 212 surrounds the third region 213, and the second region 212 is disposed between the first region 211 and the third region 213. The display device 200 of the second embodiment is substantially the same as the display device 100 of the first embodiment. Differences are that the first backlight module 220 of the second embodiment includes a first sub via hole 2261 and a second sub via hole 2262 of different sizes, and the second backlight module 230 only includes a second reflective layer 231, a second light conducting layer 232, a second light source 235, and a second via hole 236.

As shown in FIG. 3, the first backlight module 220 is disposed on the light incident surface of the display panel 210, and is configured to provide light to the first region 211 of the display panel 210. The first backlight module 220 includes a first reflective layer 221, a first light conducting layer 222, a first diffusion layer 223, a first brightness enhancement layer 224, a first light source 225, and a first via hole. The first via hole includes the first sub via hole 2261 and the second sub via hole 2262. The first reflective layer 221, the first light conducting layer 222, the first diffusion layer 223, and the first brightness enhancement layer 224 respectively include openings. The first reflective layer 221 and the first light conducting layer 222 have openings of the same size, and these openings together form the first sub via hole 2261. The first diffusion layer 223 and the first brightness enhancement layer 224 have openings of the same size, and these openings together form the second sub via hole 2262. A diameter D11 of the first sub via hole 2261 is greater than a diameter D12 of the second sub via hole 2262, and the diameter D12 of the second sub via hole 2262 is equal to a diameter D3 of the second via hole 236 of the second backlight module 230. The second sub via hole 2262 of the first backlight module 220 is aligned with the second via hole 236 of the second backlight module 230.

As shown in FIG. 3, the first light-shielding column 260 is disposed in the first sub via hole 2261 of the first backlight module 220, and is in contact with a wall of the first sub via hole 2261. The second light-shielding column 270 is disposed between the display panel 210 and the third backlight module 240, and extends vertically through the second via hole 236 of the second backlight module 230, the hollow portion 263 of the first light-shielding column 260, and the second sub via hole 2262 of the first backlight module 220. In addition, the second light-shielding column 270 is in contact with a wall of the second via hole 236, an outer periphery of the hollow portion 263, and a wall of the second sub via hole 2262.

As shown in FIG. 3, the diameter D12 of the second sub via hole 2262 of the first backlight module 220 is less than the diameter D11 of the first sub via hole 2261, so the light emitted by the second backlight module 230 will pass through the first diffusion layer 223 and the first brightness enhancement layer 224 of the first backlight module 220, thereby increasing a light utilization efficiency by the first diffusion layer 223 and the first brightness enhancement layer 224. That is, in the second embodiment of the present disclosure, the second backlight module 230 uses the partial structure of the first backlight module 220 to achieve diffusion and brightness enhancement effects, so the second backlight module 230 does not need to be formed with related layers, thereby reducing a thickness of the second backlight module 230. In addition, the first diffusion layer 223 and first brightness enhancement layer 224 of the first backlight module 220 cover a boundary between the first sub via hole 2261 and the first light-shielding column 260, so a display boundary generated at a junction of the first sub via hole 2261 and the first light-shielding column 260 can be weakened.

Figure 4:
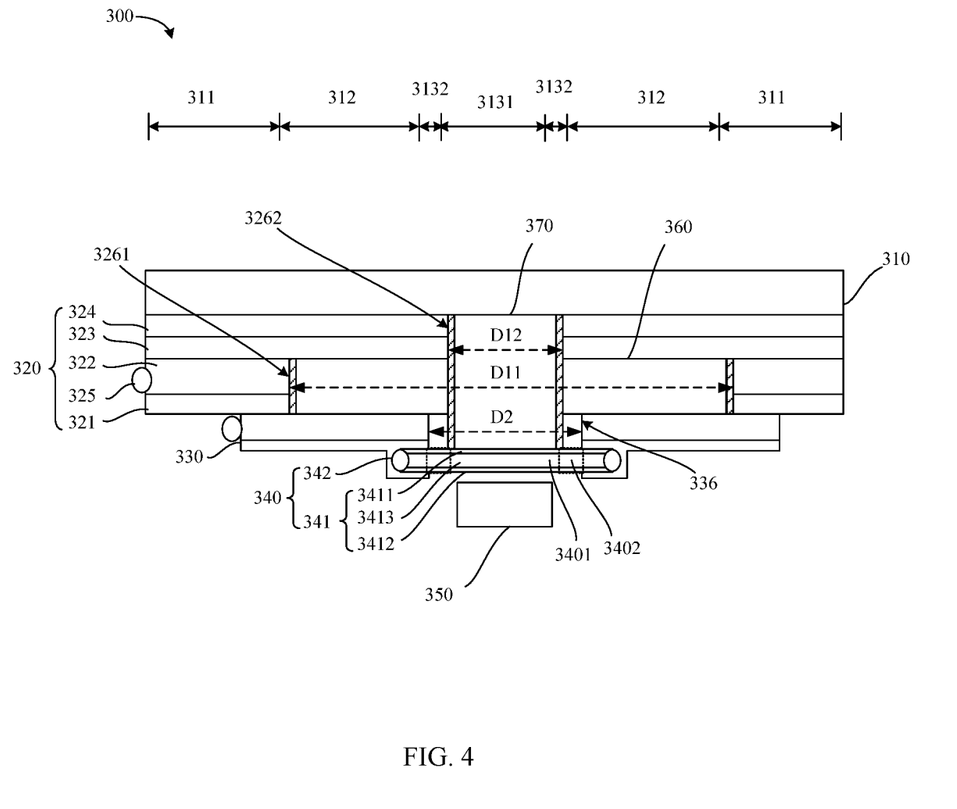
FIG. 4 shows a schematic diagram of a display device according to a third embodiment of the present disclosure.

Referring to FIG. 4, which shows a schematic diagram of a display device 300 according to a third embodiment of the present disclosure. The display device 300 includes a display panel 310, a first backlight module 320, a second backlight module 330, a third backlight module 340, a camera 350, a first light-shielding column 360, and a second light-shielding column 370. The display panel 310 includes a first region 311, a second region 312, and a third region. The second region 312 surrounds the third region, and the second region 312 is disposed between the first region 311 and the third region. The display device 300 of the second embodiment is substantially the same as the display device 200 of the second embodiment. A difference is that a diameter D12 of a second sub via hole 3262 of the first backlight module 320 of the second embodiment is less than a diameter D2 of a second via hole 336 of the second backlight module 330. The third region of the display panel 310 includes a first subregion 3131 and a second subregion 3132. The light adjustment layer 341 of the third backlight module 340 includes a first section 3401 and a second section 3402, and a haze of the first section 3401 and a haze of the second section 3402 can be adjusted independently. It should be understood that when viewed from a stereo angle, the first section 3401 of the light adjustment layer 341 is a region corresponding to the camera 350, and the second section 3402 of the light adjustment layer 341 is an annular region surrounding the first section 3401.

As shown in FIG. 4, the first backlight module 320 is disposed on a light incident surface of the display panel 310, and is configured to provide light to the first region 311 of the display panel 310. The first backlight module 320 includes a first reflective layer 321, a first light conducting layer 322, a first diffusion layer 323, a first brightness enhancement layer 324, a first light source 325, and a first via hole. The first via hole includes a first sub via hole 3261 and a second sub via hole 3262. The first reflective layer 321, the first light conducting layer 322, the first diffusion layer 323, and the first brightness enhancement layer 324 respectively include openings. The first reflective layer 321 and the first light conducting layer 322 have openings of the same size, and these openings together form the first sub via hole 3261. The first diffusion layer 323 and the first brightness enhancement layer 324 have openings of the same size, and these openings together form the second sub via hole 3262. A diameter D11 of the first sub via hole 3261 is greater than the diameter D12 of the second sub via hole 3262, and the diameter D12 of the second sub via hole 3262 is less than the diameter D2 of the second via hole 336 of the second backlight module 330. The first sub via hole 3261 and second sub via hole 3262 of the first backlight module 220 are coaxially arranged with the second via hole 236 of the second backlight module 230.

As shown in FIG. 4, the first light-shielding column 360 is disposed in the first sub via hole 3261 of the first backlight module 320, and is in contact with a wall of the first sub via hole 3261. The second light-shielding column 370 is disposed between the display panel 310 and the third backlight module 340, and extends vertically through the second via hole 336 of the second backlight module 330, the hollow portion of the first light-shielding column 360, and the second sub via hole 3262 of the first backlight module 320. In addition, the second light-shielding column 370 is in contact with an outer periphery of the hollow portion and a wall of the second sub via hole 3262, and the second light-shielding column 370 is separated from a wall of the second via hole 336 by a lateral distance.

As shown in FIG. 4, the second backlight module 330 uses the first diffusion layer 323 and the first brightness enhancement layer 324 of the first backlight module 320 to achieve diffusion and brightness enhancement effects. Therefore, the second backlight module 330 does not need to be formed with related layers, thereby reducing a thickness of the second backlight module 330. In addition, the first diffusion layer 323 and the first brightness enhancement layer 324 of the first backlight module 320 cover a boundary between the first sub via hole 3261 and the first light-shielding column 360, so a display boundary generated at a junction of the first sub via hole 3261 and the first light-shielding column 360 can be weakened. Furthermore, through a misaligned arrangement design of the first backlight module 320 and the second backlight module 330, the display boundary generated at a boundary of the second backlight module 330 can be weakened.

As shown in FIG. 4, the third backlight module 340 is disposed on a surface of the second backlight module 330 away from the first backlight module 320, and is configured to provide light to the display panel 310. The third backlight module 340 covers an end of the second via hole 336 of the second backlight module 330 away from the first backlight module 320. The third backlight module 340 includes a light adjustment layer 341 and a third light source 342. The third light source 342 is disposed on at least one side of the light adjustment layer 341. The light adjustment layer 341 includes an upper electrode 3411, a lower electrode 3412, and a polymer layer 3413. The polymer layer 3413 is disposed between the upper electrode 3411 and the lower electrode 3412. The light adjustment layer 341 is controlled to be in a foggy state or a transparent state by controlling a voltage applied to the upper electrode 3411 and the lower electrode 3412 of the light adjustment layer 341. Furthermore, the light adjustment layer 341 includes the first section 3401 and the second section 3402, and a haze of the first section 3401 and a haze of the second section 3402 can be adjusted independently. Specifically, the upper and lower electrodes of the first section 3401 and the upper and lower electrodes of the second section 3402 of the light adjustment layer 341 are respectively connected to different voltage control terminals. Therefore, different voltages can be applied to the first section 3401 and the second section 3402, so that the haze of the first section 3401 and the haze of the second section 3402 can be independently adjusted.

As shown in FIG. 4, the first section 3401 of the third backlight module 340 transmits the light emitted by the third light source 342 to the first subregion 3131 of the third region of the display panel 310 through the second light-shielding column 370. The second section 3402 of the third backlight module 340 transmits the light emitted by the third light source 342 to the second subregion 3132 of the display panel 310 through the second via hole 336, the first light-shielding column 360, the first diffusion layer 323, and the first brightness enhancement layer 324 in sequence.

As shown in FIG. 4, the first diffusion layer 323 and first brightness enhancement layer 324 of the first backlight module 320 overlap with the second section 3402 of the third backlight module 340, so the light from the second section 3402 of the third backlight module 340 can pass through the first diffusion layer 323 and the first brightness enhancement layer 324 of the first backlight module 320 to improve a light utilization efficiency. In some embodiments, the second section 3402 of the third backlight module 340 is kept at a lower haze, and the first section 3401 of the third backlight module 340 is kept at a higher haze. The light emitted from the second section 3402 of the third backlight module 340 will be weaker, but after the light passes through the first diffusion layer 323 and the first brightness enhancement layer 324 of the first backlight module 320, the brightness will increase. Therefore, by adjusting the voltages applied to the first section 3401 and the second section 3402 of the third backlight module 340, the display boundary formed at a junction of the structure can be weakened, and the display brightness of each region of the display panel 310 can be made uniform.

Figure 5:
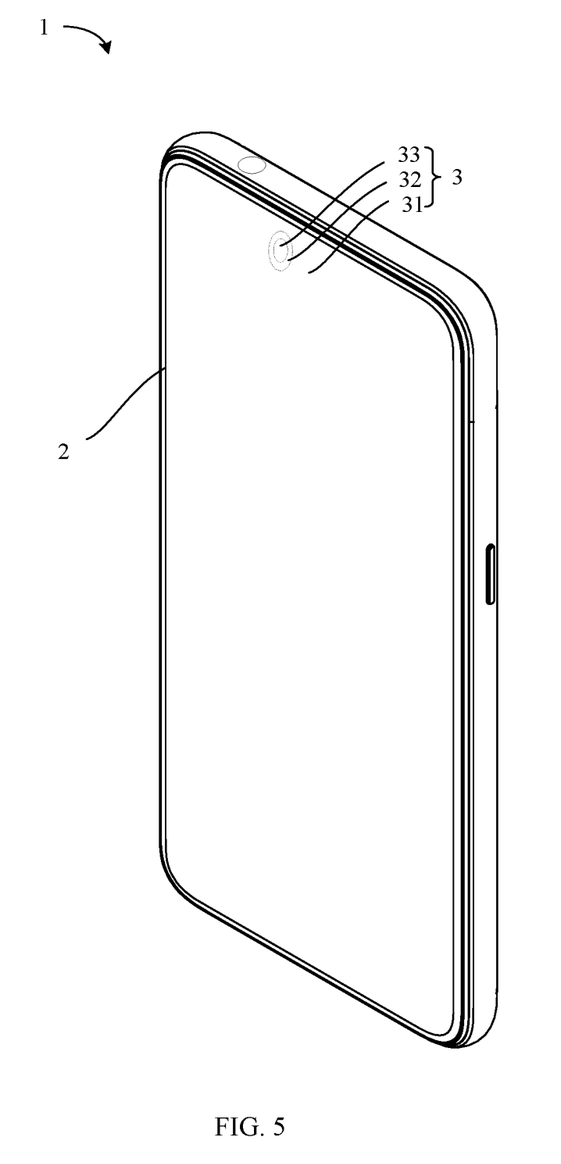
FIG. 5 shows a schematic diagram of a terminal device according to an embodiment of the present disclosure.

Referring to FIG. 5, which shows a schematic diagram of a terminal equipment 1 according to an embodiment of the present disclosure. The terminal equipment 1 may be a mobile device such as a mobile phone and a tablet, a notebook, a desktop monitor, a TV, a car monitor, etc. The terminal equipment 1 may include one or more of following components: a display device 2, a housing, a processor, a memory, a circuit board, and a power supply circuit. The display device 2 includes the display device in any of the foregoing embodiments. The circuit board is arranged in a space defined by the housing. The processor and the memory are disposed on the circuit board. The power circuit is configured to supply power to each circuit or device of the terminal equipment 1. The memory is configured to store executable program code. The processor reads the executable program codes stored in the memory and runs the programs corresponding to these executable program codes to execute the control of the above-mentioned different backlight modules and adjust light of a first region 31, a second region 32, and a third region 33 of a display panel 3.

The processor usually controls overall operations of the terminal equipment 1, such as operations relating to display, a telephone call, data communication, a camera operation and a recording operation. The processor may include one or more processors for executing instructions to complete all or a part of steps of the aforementioned backlight control method. Furthermore, the processor may include one or more modules to facilitate interaction between the processor and other components. For example, the processor may include a multimedia module to facilitate the interaction between a multimedia component and the processor.

The memory is configured to store different types of data to support operations of the terminal equipment 1. Examples of such data include instructions, contact data, phonebook data, messages, pictures, videos, and so on for any application or method that operates on the terminal equipment 1. The memory may be implemented by any type of volatile or non-volatile storage devices or a combination thereof, and the memory may be a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disk.

The power supply circuit supplies power for different components of the terminal equipment 1. The power supply circuit may include a power supply management system, one or more power supplies, and other components associated with generating, managing, and distributing power for the terminal equipment 1.

In an example, the terminal equipment 1 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements to perform the above backlight control.

In the present disclosure, the camera is disposed under the display panel, and the display panel has no openings, ensuring the integrity of the display panel. By using different backlight modules to provide light to different regions of the display panel, brightness of different regions of the display panel can be independently controlled, and a true full-screen display is also realized. In addition, by setting the light-shielding columns, it can prevent a light leakage of the first backlight module from affecting a shooting of the camera, thereby achieving excellent light leakage prevention performance and ensuring a shooting quality of the camera. In addition, in comparison with the prior art, light-shielding components such as a light-shielding adhesive, a metal frame, a sealant are omitted, thereby preventing the screen from displaying black borders.

The above is a detailed introduction to the display device provided by the embodiments of the present disclosure. Specific embodiments are used in this specification to describe the principle and implementation of the present disclosure. The description of the above embodiments is only used to help understand the technical solutions of present disclosure and its core idea. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. A display device with a built-in camera, comprising:
a display panel comprising a first region, a second region, and a third region, wherein the second region is disposed between the first region and the third region;
a first backlight module disposed on a light incident surface of the display panel, comprising a light source and configured to provide light to the first region of the display panel, wherein the first backlight module comprises a first via hole;
a second backlight module disposed on a surface of the first backlight module away from the display panel, comprising a light source and configured to provide light to the second region of the display panel, wherein the second backlight module comprises a second via hole, and the first via hole is connected to the second via hole;
a third backlight module disposed on a surface of the second backlight module away from the first backlight module, comprising a light source and configured to provide light to the third region of the display panel, wherein the third backlight module covers an end of the second via hole away from the first backlight module entirely;
a camera disposed on a side of the third backlight module away from the second backlight module, wherein the camera is aligned with the third region of the display panel, and is configured to obtain external light to take a picture, and the external light enters an interior of the display device through the third region;
a first light-shielding column disposed in the first via hole, wherein the first light-shielding column is a three-dimensional ring-shaped column structure and comprises a hollow portion, and the first light-shielding column is configured to block the light from the first backlight module from laterally entering the first light-shielding column; and
a second light-shielding column disposed between the display panel and the third backlight module, wherein the second light-shielding column is a three-dimensional columnar structure and extends vertically through the second via hole and the hollow portion of the first light-shielding column, and the second light-shielding column is configured to block light from the first light-shielding column from laterally entering the second light-shielding column.

2. The display device with the built-in camera according to claim 1, wherein the third backlight module comprises a light adjustment layer and the light source, and the light source is disposed on at least one side of the light adjustment layer; and
the light adjustment layer is controlled to be in a foggy state or a transparent state by controlling a voltage applied to the light adjustment layer, in response to the light adjustment layer being in the foggy state, the light source emits light and the light is transmitted to the third region of the display panel through the light adjustment layer, and in response to the light adjustment layer being in the transparent state, the light source is turned off and the external light is transmitted to the camera through the third backlight module.

3. The display device with the built-in camera according to claim 2, wherein the light adjustment layer comprises an upper electrode, a lower electrode, and a polymer layer, and the polymer layer is disposed between the upper electrode and the lower electrode.

4. The display device with the built-in camera according to claim 1, wherein the first backlight module comprises:
a first reflective layer;
a first light conducting layer disposed on the first reflective layer;
a first diffusion layer disposed on the first light conducting layer;
a first brightness enhancement layer disposed between the first diffusion layer and the light incident surface of the display panel; and
the light source disposed on at least one side of the first light conducting layer.

5. The display device with the built-in camera according to claim 4, wherein the first reflective layer, the first light conducting layer, the first diffusion layer, and the first brightness enhancement layer respectively comprise openings of a same size, the openings together form the first via hole, and a diameter of the first via hole is greater than a diameter of the second via hole.

6. The display device with the built-in camera according to claim 4, wherein the first via hole comprises a first sub via hole and a second sub via hole;
the first reflective layer, the first light conducting layer, the first diffusion layer, and the first brightness enhancement layer respectively comprise openings;
the openings of the first reflective layer and the first light conducting layer together form the first sub via hole, the openings of the first diffusion layer and the first brightness enhancement layer together form the second sub via hole, and a diameter of the first sub via hole is greater than a diameter of the second sub via hole; and the first light-shielding column is disposed in the first sub via hole and is in contact with a wall of the first sub via hole.

7. The display device with the built-in camera according to claim 6, wherein the diameter of the second sub via hole is equal to a diameter of the second via hole, and the second light-shielding column is in contact with a wall of the second sub via hole and a wall of the second via hole.

8. The display device with the built-in camera according to claim 6, wherein the diameter of the second sub via hole is less than a diameter of the second via hole, and the second light-shielding column is in contact with a wall of the second sub via hole; and the second light-shielding column is separated from a wall of the second via hole by a lateral distance.

9. The display device with the built-in camera according to claim 8, wherein the third region of the display panel comprises a first subregion and a second subregion, the second subregion surrounds the first subregion, and the second subregion is disposed between the second region and the first subregion;

the third backlight module comprises a light adjustment layer and the light source, the light source is disposed on at least one side of the light adjustment layer, the light adjustment layer comprises a first section and a second section, and a haze of the first section and a haze of the second section can be adjusted independently;

the first section of the third backlight module transmits the light emitted by the light source to the first subregion of the display panel through the second light-shielding column, and the second section of the third backlight module transmits the light emitted by the light source to the second subregion of the display panel through the second via hole, the first light-shielding column, the first diffusion layer, and the first brightness enhancement layer in sequence.

10. The display device with the built-in camera according to claim 1, wherein the first light-shielding column comprises a first light-transmitting column and a first light-shielding layer, and the first light-shielding layer covers a side surface of the first light-transmitting column; and the second light-shielding column comprises a second light-transmitting column and a second light-shielding layer, and the second light-shielding layer covers a side surface of the second light-transmitting column.

11. A display device with a built-in camera, comprising:
a display panel comprising a first region, a second region, and a third region, wherein the second region is disposed between the first region and the third region;
a first backlight module disposed on a light incident surface of the display panel, comprising a light source and configured to provide light to the first region of the display panel, wherein the first backlight module comprises a first via hole;
a second backlight module disposed on a surface of the first backlight module away from the display panel, comprising a light source and configured to provide light to the second region of the display panel, wherein the second backlight module comprises a second via hole, and the first via hole is connected to the second via hole;
a third backlight module disposed on a surface of the second backlight module away from the first backlight module, comprising a light source and configured to provide light to the third region of the display panel, wherein the third backlight module covers an end of the second via hole away from the first backlight module entirely;
a camera disposed on a side of the third backlight module away from the second backlight module, wherein the camera is aligned with the third region of the display panel, and is configured to obtain external light to take a picture, and the external light enters an interior of the display device through the third region;
a first light-shielding column disposed in the first via hole and comprising a hollow portion, wherein the first light-shielding column is configured to block the light from the first backlight module from laterally entering the first light-shielding column; and
a second light-shielding column disposed between the display panel and the third backlight module, and extending vertically through the second via hole and the hollow portion of the first light-shielding column, wherein the second light-shielding column is configured to block light from the first light-shielding column from laterally entering the second light-shielding column.

12. The display device with the built-in camera according to claim 11, wherein the third backlight module comprises a light adjustment layer and the light source, and the light source is disposed on at least one side of the light adjustment layer; and the light adjustment layer is controlled to be in a foggy state or a transparent state by controlling a voltage applied to the light adjustment layer, in response to the light adjustment layer being in the foggy state, the light source emits light and the light is transmitted to the third region of the display panel through the light adjustment layer, and in response to the light adjustment layer being in the transparent state, the light source is turned off and the external light is transmitted to the camera through the third backlight module.

13. The display device with the built-in camera according to claim 12, wherein the light adjustment layer comprises an upper electrode, a lower electrode, and a polymer layer, and the polymer layer is disposed between the upper electrode and the lower electrode.

14. The display device with the built-in camera according to claim 11, wherein the first backlight module comprises:
a first reflective layer;
a first light conducting layer disposed on the first reflective layer;
a first diffusion layer disposed on the first light conducting layer;
a first brightness enhancement layer disposed between the first diffusion layer and the light incident surface of the display panel; and
the light source disposed on at least one side of the first light conducting layer.

15. The display device with the built-in camera according to claim 14, wherein the first reflective layer, the first light conducting layer, the first diffusion layer, and the first brightness enhancement layer respectively comprise openings of a same size, the openings together form the first via hole, and a diameter of the first via hole is greater than a diameter of the second via hole.

16. The display device with the built-in camera according to claim 14, wherein the first via hole comprises a first sub via hole and a second sub via hole;
the first reflective layer, the first light conducting layer, the first diffusion layer, and the first brightness enhancement layer respectively comprise openings;

the openings of the first reflective layer and the first light conducting layer together form the first sub via hole, the openings of the first diffusion layer and the first brightness enhancement layer together form the second sub via hole, and a diameter of the first sub via hole is greater than a diameter of the second sub via hole; and the first light-shielding column is disposed in the first sub via hole and is in contact with a wall of the first sub via hole.

17. The display device with the built-in camera according to claim 16, wherein the diameter of the second sub via hole is equal to a diameter of the second via hole, and the second light-shielding column is in contact with a wall of the second sub via hole and a wall of the second via hole.

18. The display device with the built-in camera according to claim 16, wherein the diameter of the second sub via hole is less than a diameter of the second via hole, and the second light-shielding column is in contact with a wall of the second sub via hole; and the second light-shielding column is separated from a wall of the second via hole by a lateral distance.

19. The display device with the built-in camera according to claim 18, wherein the third region of the display panel comprises a first subregion and a second subregion, the second subregion surrounds the first subregion, and the second subregion is disposed between the second region and the first subregion;

the third backlight module comprises a light adjustment layer and the light source, the light source is disposed on at least one side of the light adjustment layer, the light adjustment layer comprises a first section and a second section, and a haze of the first section and a haze of the second section can be adjusted independently;

the first section of the third backlight module transmits the light emitted by the light source to the first subregion of the display panel through the second light-shielding column, and the second section of the third backlight module transmits the light emitted by the light source to the second subregion of the display panel through the second via hole, the first light-shielding column, the first diffusion layer, and the first brightness enhancement layer in sequence.

20. The display device with the built-in camera according to claim 11, wherein the first light-shielding column comprises a first light-transmitting column and a first light-shielding layer, and the first light-shielding layer covers a side surface of the first light-transmitting column; and the second light-shielding column comprises a second light-transmitting column and a second light-shielding layer, and the second light-shielding layer covers a side surface of the second light-transmitting column.

* * * * *